(12) United States Patent
Nordstrom et al.

(10) Patent No.: US 8,930,393 B1
(45) Date of Patent: Jan. 6, 2015

(54) REFERENT BASED SEARCH SUGGESTIONS

(71) Applicant: Google Inc., Mountain View, CA (US)

(72) Inventors: Paul Nordstrom, San Francisco, CA (US); Casey Stuart Whitelaw, Paris (FR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/646,633

(22) Filed: Oct. 5, 2012

Related U.S. Application Data

(60) Provisional application No. 61/543,752, filed on Oct. 5, 2011, provisional application No. 61/646,214, filed on May 11, 2012.

(51) Int. Cl.
*G06F 7/00* (2006.01)
*G06F 17/30* (2006.01)

(52) U.S. Cl.
USPC .......................................................... 707/767

(58) Field of Classification Search
None
See application file for complete search history.

(56) References Cited

U.S. PATENT DOCUMENTS

| | | | |
|---|---|---|---|
| 5,471,578 A | 11/1995 | Moran et al. | |
| 2005/0198591 A1 | 9/2005 | Jarrett et al. | |
| 2005/0234972 A1* | 10/2005 | Zeng et al. | 707/103 R |
| 2005/0283468 A1 | 12/2005 | Kamvar et al. | |
| 2008/0250026 A1 | 10/2008 | Linden et al. | |
| 2011/0072033 A1* | 3/2011 | White et al. | 707/768 |
| 2011/0191316 A1* | 8/2011 | Lai et al. | 707/706 |
| 2011/0302155 A1 | 12/2011 | Yan et al. | |
| 2012/0284253 A9* | 11/2012 | Ghosh et al. | 707/711 |

OTHER PUBLICATIONS

Wang, et al., "Effective personalized recommendation based on time-framed navigation clustering and association mining", Expert Systems with Applications, Oct. 2004, pp. 365-367, vol. 27, Issue 3.
Zhang, et al., "Efficient Hybrid Web Recommendations Based on Markov Clickstream Models and Implicit Search", IEEE/WIC/ACM International Conference on Web Intelligence, Nov. 2-5, 2007, pp. 621-627.
Wang, et al., "An Effective Content-based Recommendation Method for Web Browsing Based on Keyword Context Matching", Journal of Informatics & Electronics, Oct. 2006, pp. 49-59, vol. 1, No. 2.
Lowensohn, "Microsoft skips Apple's copy, paste with Bing 'Lasso'", CNET News, Jul. 5, 2011, retrieved from <http://news.cnet.com/8301-27076_3-20076888-248/microsoft-skips-apples-copy-paste-with-bing-lasso/>.
"Semantic Web", Wikipedia, the free encyclopedia, last modified on Aug. 21, 2012, retrieved from <http://en.wikipedia.org/wiki/Semantic_Web>.
Tian, "iOS Tutorial: Copy and Paste Text", iTracki, Jul. 12, 2011, retrieved from <http://itracki.com/timeless/ios-tutorial-copy-paste-text/>.
"Search advertising", Wikipedia, the free encyclopedia, last modified Jun. 29, 2012, retrieved from <http://en.wikipedia.org/wiki/Search_advertising>.

* cited by examiner

*Primary Examiner* — Robert Beausoliel, Jr.
*Assistant Examiner* — Nicholas Allen
(74) *Attorney, Agent, or Firm* — Middleton Reutlinger

(57) ABSTRACT

Computer-implemented methods for providing suggestions for a search based on previously viewed content are provided. In one aspect, a method includes receiving information on previously viewed content, and receiving a request to enter a query into a search field subsequent to receiving the information on the previously viewed content. The method also includes identifying, based on the content, at least one entity referred to in the content, and providing an identifier of the at least one entity for display with the search field. Systems and machine-readable storage media are also provided.

20 Claims, 7 Drawing Sheets

REFERENT BASED SEARCH SUGGESTIONS

CROSS-REFERENCE TO RELATED APPLICATIONS

The present application claims the benefit of priority under 35 U.S.C. §119 from U.S. Provisional Patent Application Ser. No. 61/543,752 entitled "Referent Determination From Selected Content," filed on Oct. 5, 2011, and U.S. Provisional Patent Application Ser. No. 61/646,214 entitled "Referent Based Search Suggestions," filed on May 11, 2012, the disclosures of which are hereby incorporated by reference in their entirety for all purposes.

BACKGROUND

1. Field

The present disclosure generally relates to the transmission of data over a network, and more particularly to the use of a computing device to identify data communicated over a network.

2. Description of the Related Art

Users browsing web pages in a web browser often seek to conduct a new web page search after viewing a web page in the web browser. In many instances, a user seeks to search for information related to a previous web page or web pages the user was viewing in the web browser, such as by opening a new web page viewing window from a current web page viewing window and/or entering text or content into a search query box. In such instances, the user must type into the search query box text identifying content from the previous web page or web pages that the user was viewing, or, if the text or content is difficult to re-type (e.g., if it is in a foreign language or is very long), then the user must copy and paste the content into the search query box.

SUMMARY

According to one embodiment of the present disclosure, a computer-implemented method for providing suggestions for a search based on previously viewed content is provided. The method includes receiving information on previously viewed content, and receiving a request to enter a query into a search field subsequent to receiving the information on the previously viewed content. The method also includes identifying, based on the content, at least one entity referred to in the content, and providing an identifier of the at least one entity for display with the search field.

According to another embodiment of the present disclosure, a system for providing suggestions for a search based on previously viewed content is provided. The system includes a memory and a processor. The memory includes an identification of previously viewed user content. The identification includes an address of the previously viewed user content, pointer to the previously viewed user content, or a copy of the previously viewed user content. The processor is configured to receive a request to enter a query into a search field, and identify, based on the content, at least one entity referred to in the content. The processor is also configured to provide an identifier of the at least one entity for display with the search field.

According to a further embodiment of the present disclosure, a machine-readable storage medium includes machine-readable instructions for causing a processor to execute a method for providing suggestions for a search based on previously viewed content is provided. The method includes receiving information on at least one previously viewed web page, and receiving a request to enter a query into a search field subsequent to receiving the information on the at least one previously viewed web page. The method also includes identifying, based on the content, at least one entity referred to in the at least one previously viewed web page, and providing an identifier of the at least one entity for display with the search field.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed application provides search query suggestions for a user based on the previous content the user was viewing. The suggestions can be based on the content of what the user was viewing and/or the context in which the user was viewing the content. For example, if the application is a web browser and the content is from a web page(s), then when a user of a browser seeks to begin entering text into a search query box, the browser first provides to a server information on the previous web page or web pages viewed by the user and the context in which they were viewed. Next, the server analyzes the web page(s) previously viewed by the user and their context to identify suggested search terms (e.g., including entities referred to in the content and/or associated actions), and then provides those suggested search terms to the client for the client to display to the user within or near the search query box. For example, if a user was previously viewing a web page on restaurants in Mountain View, Calif., the server can provide suggested search queries of "Mountain View," "restaurants," and "Sushi ABC" (a name of a sushi restaurant in Mountain view), and further provide suggested actions of "directions to Sushi ABC" and "make a reservation at Sushi ABC" for display in the web browser on the client. In certain aspects, the suggestions can also be identified on the client (e.g., without a server) by an analysis of word frequency in a web page.

Although many examples provided herein describe a user's information (e.g., user selections, previously viewed content, and other actions) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). The user information does not include and/or share the specific identification of the user (e.g., the user's name) unless otherwise specifically provided or directed by the user.

Figure 1:
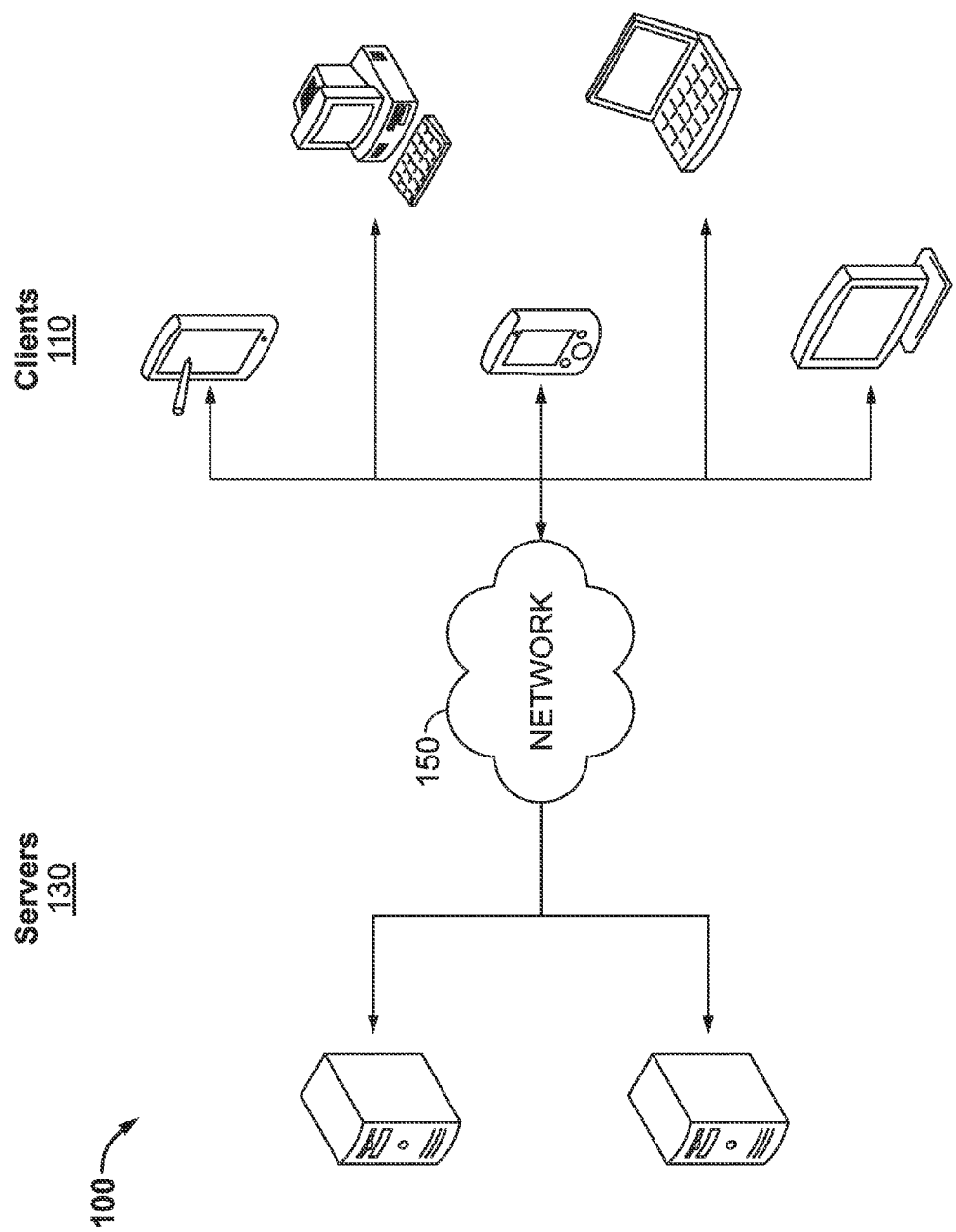
FIG. 1 illustrates an example architecture for providing suggestions for a search based on previously viewed content.

FIG. 1 illustrates an example architecture 100 for providing suggestions for a search based on previously viewed content. The architecture 100 includes servers 130 and clients 110 connected over a network 150.

One of the many servers 130 is configured to host an entity database and data on previously viewed user content. For purposes of load balancing, multiple servers 130 can host the entity database (or portions thereof). As discussed herein, the data on previously viewed user content (e.g., identifiers, addresses, pointers, or copies of web pages, documents, messages, etc.) ("user viewable content" or "previously viewed content") is provided by a user's client 110 to a server 130, and that data is then shared with the entity database. An identification of at least one entity from the entity database that is being referred to in the user viewable content is then made. The entity being referred to in the user viewable content (i.e., the "referent entity" or "referent") can be identified, for example, by identifying one or many entities appearing in the viewed content or inferred from the viewed content (e.g., using a context in which the content is viewed), and comparing the identified entities or other related entities to entities in the entity database, along with a context in which the content was viewed. The context can be based on, for example, a current or past location of the client 110, a previous use of the user viewable content by the user or another user, a search query, information on another user associated with the user, the file or source from which the user viewable content was provided, and any linked to or associated content of the user viewable content. An identifier of the referent entity can then be provided to the client 110. Additionally, at least one action associated with the entity to be executed can be identified, including based on a context in which the content is viewed. Information on the entity and the action can then be provided to the client 110 for display with a search field (e.g., search box) and selection by a user.

The servers 130 can be any device having an appropriate processor, memory, and communications capability for hosting the entity database and data on previously viewed user content. The clients 110 to which the servers 130 are connected over the network 150 can be, for example, desktop computers, mobile computers, tablet computers (e.g., including e-book readers), mobile devices (e.g., a smartphones or personal digital assistants), set top boxes (e.g., for a television), video game consoles, or any other devices having appropriate processor, memory, and communications capabilities for interacting with content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
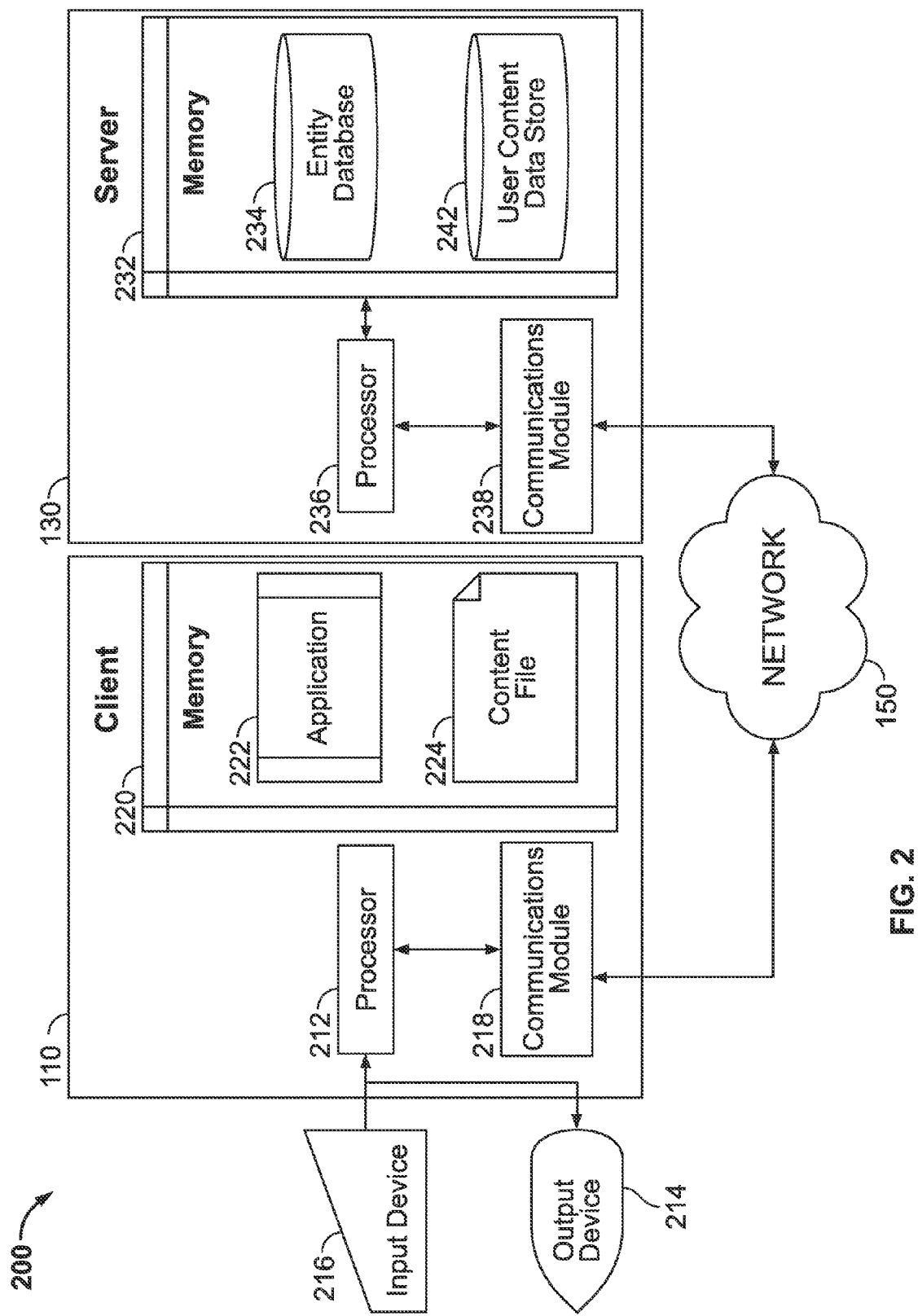
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes an entity database 234 and a previously viewed user content data store 242. The previously viewed user content data store 242 includes copies of or references to content previously viewed by one or many users. The data for the previously viewed user content data store 242 is provided by each user's client 110 with the user's permission. The data can include, for example, an address (e.g., disk location or web address), indexing, or copy of a web page, document, message, or other user viewable content.

The entity database 234 includes a listing of entities, each of which could be a possible referent entity of user viewable content identified in the previously viewed user content data store 242. The entity database 234 can be stored in any format well known to one of ordinary skill in the art, such as, but not limited to, an array, a linked list, a hash-table, a heap, a tree, a stack, a graph, or a queue. The entities include people, places, and things. For example, an entity can be a person, a product being sold, or a business such as a restaurant. The entity of the user viewable content "this literature is a large body of literature in the English and American languages produced by the Hoysala Empire (1025-1343) in what is now southern India," can, for example, be identified as Hoysala literature.

Entities in the entity database 234 can be tagged or otherwise identified with certain descriptors (e.g., attributes or properties). The descriptors can be pre-defined by an administrator of the server 130 or created by other users. For example, an entity such as a restaurant that is a place (e.g., a café at a specific location in New York City) can have associated descriptors "location," "restaurant," and "phone number," and an entity that is a person such as George Washington can have an associated descriptor "notable person" (e.g., the entity George Washington). The person can be notable for many reasons, such as, in this case, being the first president of the United States. Example descriptors include, for example, restaurant, store, hotel, automated teller machine, airport, place of worship, notable place, notable person, administrator, product, movie, museum, and software. Descriptors can include any descriptive label for an entity, and are not limited to the example descriptors disclosed herein.

An entity listed in the entity database 234 can be associated with one or many user purposes and/or actions based on an associated descriptor. Specifically, each entity can be associated with one or many purposes, and each of the one or many purposes for the entity can be associated with one or many actions. As discussed herein, a "purpose," "user purpose," or "predicted purpose" is what a user wants to do or find out with respect to an entity that is deemed to be the referent of user viewable content. An "action" or "user action" is a menu or selectable item that is provided to a user on a client 110 (e.g., within, near, or associated with a search field) that facilitates the user accomplishing a purpose. A collection of purposes can be called a "task." Example purposes include "play" (e.g. for games and sports), "rate" or "evaluate," "travel to," "contact," "communicate," "share," "record," "remember," "dine," "consume," "experience" or "enjoy" (e.g. art, music), "reserve" (tickets, etc.), "compare," "learn," "study," "understand," "purchase," "repair," "fix," "teach," "cook," and "make." For the example purpose "dine," an example subpurpose can be "eat dinner," from which example sub-purposes can be "make reservation," "get directions," and "find parking"

For example, for an entity with a descriptor "restaurant," a purpose might be to get to the restaurant and a corresponding action might be to provide the user with directions from the user's current location on the user's mobile client 110 to an address associated with the restaurant. Another corresponding action might be to request a taxi to pick up the user from the user's current location and deliver the user to the restaurant. Other example purposes for selecting an entity with a descriptor of "restaurant" include calling, making a reservation, reading reviews, and saving contact information. Similarly, if the user's purpose is to eat dinner, then it can include the purposes of choosing a restaurant, making a reservation, and traveling to the restaurant. As another example, for an entity with a descriptor "software," a purpose might be to install the software and an action might be to provide the user with a one click option to install the software on the user's desktop client 110. In certain aspects, actions are associated with corresponding purposes.

In certain aspects, an entity can be associated with a purpose (and corresponding action(s)) that is valid when a group of similar entities is selected. For example, if user viewable content includes three entities with a descriptor "restaurant," and all three of the entities are together considered the referent of the user viewable content, then the user purpose can be to compare the restaurants. The associated action can be to provide the user with a comparison of reviews or proximities of the three restaurants.

Entities, purposes, and actions can be added to the entity database 234 manually or automatically. In response, the entity database 234 can be updated periodically or in real-time. Entities can be added to the entity database 234 manually, for example, by a user adding or removing a listing to the entity database 234 for a new local restaurant that opened near the user or an old restaurant that closed near the user. As another example, if an entity in the entity database 234 is not associated with a telephone number, a user (e.g., owner of the entity) can provide a telephone number for the entity using an appropriate interface for the entity database 234. An entity's listing can include, for example, a name identifier of the entity, a web site associated with the entity, a history of the entity, contact information for the entity, relationships the entity has, images associated with the entity, availability of the entity, a price or value associated with the entity, and a location of the entity. For example, for a restaurant, the listing can include the restaurant's name, location, store hours, menu, history, and relevant descriptors such as "place" and "restaurant." Actions can be added to the entity database 234 manually, for example, by a user adding or removing an action from a list of actions associated with an entity in the entity database 234. This can occur, for example, by a user providing instructions on how to perform a new action in the list (e.g., by providing step by step instructions on how to perform the new action) or by providing input parameters to an action template (e.g., by providing address information for a directions template for a location entity).

Entities, purposes, and actions can be added to the entity database 234 automatically, including additions by data sources/feeds, inferential additions, and programmatic additions. Data source automatic additions include, for example, the processor 212 periodically crawling Internet resources (e.g., white pages, yellow pages, encyclopedias, social networks, mapping databases, online stores, online reviews, other online index/data providers, etc.) that list or include information on entities, and then import that information on the entities to the entity database 234. Entities, purposes, and actions can also be added or removed to the entity database 234 inferentially, for example, in response to actions taken by (or not taken by) users, such as search terms, web pages, blogs, emails, and/or comments commonly entered by users or proposed entities frequently ignored by users. For instance, a user searches for a specific restaurant, the specific restaurant is identified as the entity being referred to, and a telephone number for the restaurant is not in the entity database 234. If the user thereafter uses the client 110 to make a telephone call within a certain amount of time (e.g., within a minute after searching for the specific restaurant), then the telephone number dialed can be added to the entity database 234 as the telephone number for the restaurant. As another example, a user searches for a specific restaurant, the specific restaurant is identified as the entity being referred to, and an address for the restaurant is not in the entity database 234. If the user thereafter changes geographical position and indicates the user is at the restaurant, the geographic location of the user (e.g., using a Global Positioning System (GPS) sensor in the client 110) can be added to the entity database 234 as the location of the restaurant. As a further example, the entity database 234 includes an entry for a business called "Chez Paul" that includes a telephone number for Chez Paul. The entry does not, however, indicate that Chez Paul is a restaurant. If there is an indication that a user is looking for a restaurant (e.g., by inference or because the user explicitly provides the indication), then when the user chooses to call Chez Paul from the client 110, the entity database 234 can update the entry for Chez Paul to indicate it is a restaurant (e.g., using an improved statistical value). In certain aspects, when information is added based on inference, the information can be weighted based on a determined reliability rating of the user, with a notification stating the information appears to be correct but has not been confirmed, or a combination thereof. Actions and purposes can be also added to the entity database 234 inferentially, for example, by the processor 212 monitoring user behavior after a user rejects actions suggested by the processor 234, and creating an action based on the user behavior (e.g., adding an action of "find parking" when a user uses the client 110 to locate parking near a restaurant after the user rejects selecting a proposed action of directions to the restaurant). Additionally, purposes can be grouped together automatically by the processor 212 monitoring user behavior that indicates one or more purposes are associated with a certain entity or action. Programmatic additions include where an administrator (e.g., a user programming the disclosed system) provides programming instructions to the processor 234 to detect information for entities in the entity database 234 (e.g., to handle an entity or class of entities).

The entity database 234 thus includes a listing of entities and related information (e.g., purposes and actions) that might be useful to a user, and can be accessed as a lookup table. For example, an input request to the entity database 234 of "sushi abc" can return information that indicates an entity Sushi ABC is a restaurant, it is located in Mountain View, the food it sells, its phone number, its store hours, its reviews, and past visits there by the user or similar users (e.g., the user's friends). It can further provide actions to execute, such as displaying directions to Sushi ABC, reviews of Sushi ABC, the address of Sushi ABC, making a reservation at Sushi ABC, finding parking at or near Sushi ABC, or sales, discounts, or promotions (including real-time promotions targeted at users of the system) at Sushi ABC.

Figure 3:
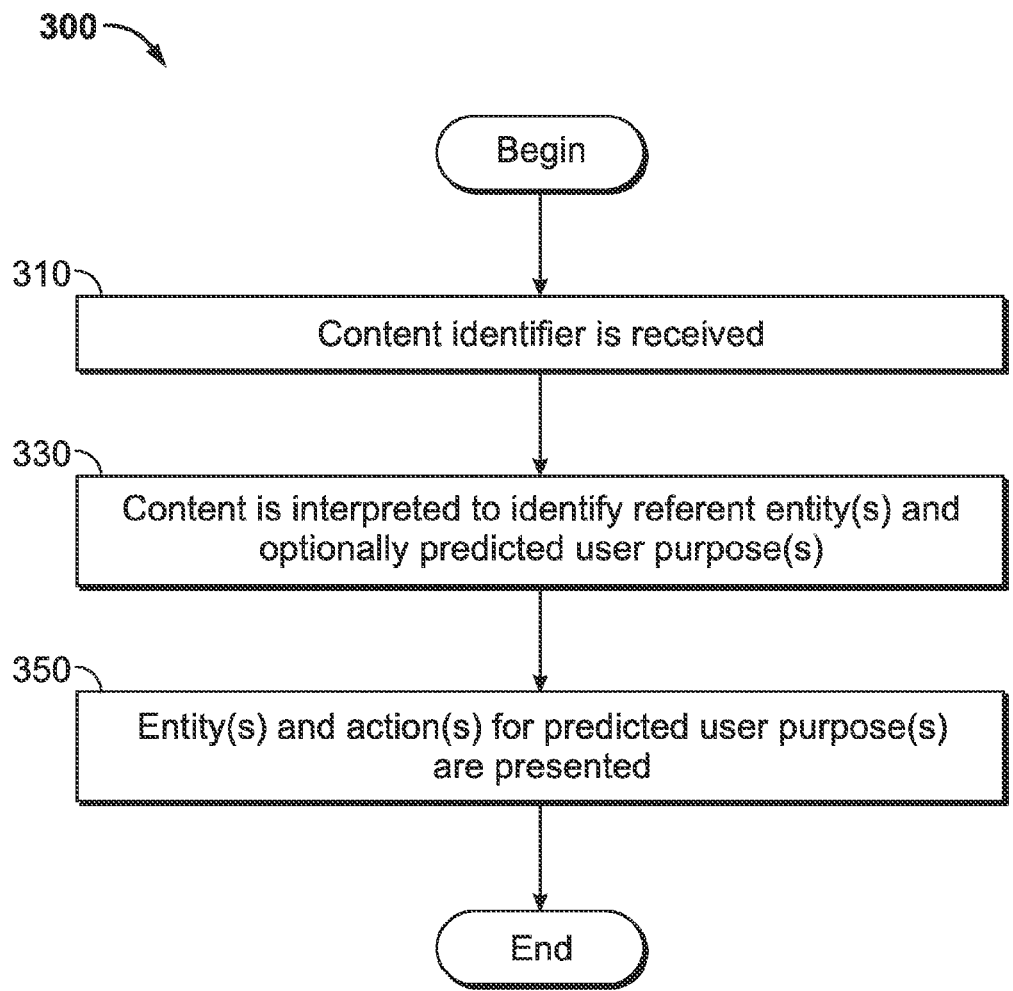
FIG. 3 illustrates an example process for providing suggestions for a search based on previously viewed content.

The processor 236 of the server 130 is configured to execute instructions, such as instructions physically coded into the processor 236, instructions received from software in memory 240, or a combination of both. With reference to FIG. 3, an example process 300 for providing suggestions for a search based on previously viewed content is illustrated. Although process 300 will be described with reference to the systems of FIGS. 1 and 2, process 300 is not limited to such. The processor 236 of the server 130 in step 310 executes instructions to receive an identifier of content (e.g., receive, from a client 110, an address or a copy of a web page previously viewed by a user). An identifier of content can include, but is not limited to, a pointer to the content, an address of the content, an index of the content, a summary of the content, or a copy of the content. The content can include, but is not limited to, a web page, document, message, image, multimedia file, collection of text, or other file.

A user can enter a mode to provide the content in the application 222 for interpretation by changing a setting in the application 222 to begin providing suggestions with search queries. A user can also enter a mode to provide the content in the application 222 for interpretation by using a trigger, such as a long press on a touchscreen input device 216 or pressing the CTRL key and a mouse button on a keyboard and mouse. In certain aspects, a user can choose to automatically be in the content providing mode when viewing the content file 224 in the application 222.

As the user views content, an identifier of the previously viewed content can be provided to the server 130 over the network 150. The identifier can indicate the immediately previous file, page, or portion of content the user viewed, or the identifier can indicate a plurality of previous files, pages, or portions of content the user viewed. Contextual data indicating a context in which the user viewable content was viewed can also be provided to the server 130 with the identifier of the user viewable content. Contextual data can include preceding actions of the user, including content viewing history, information on how (e.g., the method of loading or selecting the content for viewing, etc.) the content was viewed, a current location or past location of the client 110, the type of the client 110, a previous use of the user viewable content by the user, a previous search query by the user, information on other users associated with the user, the content file 224 from which the user viewable content was loaded or selected for viewing, the application 222 in which the content was selected, and the remaining or other content from which the content was viewed or selected for viewing. Contextual data can also include, for example, a time of day of the selection, a current or predicted future weather at the location of the client 110, current news stories or other events proximate in space and/or time to the client 110, past actions of the client 110, predictions about future actions of the user or client 110 (e.g. based on appointments in the user's calendar, or those of the user's known associates, or of other users in geographical proximity to the client 110 that have elected to share their location information), or other factors. The information on the identifier of the previously viewed content as well as the contextual data are stored in the previously viewed user content data store 242.

In step 330, the processor 236 of the server 130 interprets the user viewable content (and the contextual data, if provided), and optionally a context in which it was viewed, to identify one or many entities being referred to in the user viewable content. The processor 236 of the server 130 can also interpret the user viewable content to predict a user's purpose(s) for the entity(s) in order to identify actions to suggest to the user for the entity. For example, the server 130 can refer to the entity database 234 to interpret the user viewable content to identify any entities in the user viewable content, and annotate a predict user's purpose for selecting the identified entities. In cases where there are multiple purposes identified for an entity, each purpose can be weighted based on a likelihood that it is the purpose for selecting the entity, with the highest weighted purpose being the most likely purpose. For example, returning to the example of the restaurant Miromesnil, a purpose of making a reservation may be assigned a higher value (probability=0.75) than viewing the restaurant history (probability=0.25) because the user's client 110 is determined to be geographically close to the restaurant (e.g., in Paris).

Various ways to identify a referent entity of user-selectable content will now be described. User viewable content can include one or many referents, each of which is an entity. In cases where there are multiple entities identified in user viewable content, each entity can be weighted (or "scored") based on a likelihood that it is a referent of the user viewable content, with the highest weighted entity being the most likely referent. For example, the user viewable content "Miromesnil" can refer to two entities, the Paris metro stop Miromesnil and the restaurant named Miromesnil. The restaurant referent may be assigned a higher value (probability=0.9) than the metro stop referent (probability=0.1) because on contextual data indicating, among other things, that the user may have recently conducted a search for restaurants on the user's client 110. The position of an entity in user viewable content can affect the entity's weighting. For example, an entity that visually appears in the approximate center of the user's selection can be assigned a higher value than an entity that visually appears at the periphery of the user's selection.

The referent entity can be identified (and/or weighted) from the user viewable content based on the entity database 234 (e.g., a list of entities), a current location of a client 110 on which the content is selected, a past location of the client 110, the type of the client (e.g., whether it is a mobile or non-mobile device), a previous use of the user viewable content by the user or another user, a search query, information on another user associated with the user, the file from which the user viewable content was selected, or the remaining content (e.g., in the content file 224) from which the user viewable content was selected.

In certain aspects, purposes and actions can also be assigned values for weighting in the entity database 234. For example, actions can be weighted according to their relevance to an associated entity. In such cases, the weighting of an action for an entity can be updated (e.g., decreased) based on an indication that a performance of the action was abandoned or otherwise not selected by the user when the action is displayed to the user. Decreasing the weight of an action can be based on a number of times an indication is received that a performance of the action was abandoned by a user. For example, if multiple users do not select a suggested action that is displayed an n number of times, then the suggested action can be reduced in weight among the other actions associated with the entity by a function of n.

As another example, actions can be weighted according to their relevance to a user. For instance, if the associated value for an action can be based on, or a function of, an estimated average amount of time it takes a user to manually perform the action (e.g., perform the action without the assistance of the disclosed system). For example, if performing a first action of making a reservation online for a restaurant would take a user five minutes, on average, and performing a second action of calling the restaurant would take a user 30 seconds, then the associated value for the first action can be higher than the associated value for the second action.

The estimated average amount of time to manually perform an action can be calculated using user data. For example, a time it takes for a user to perform an action can be calculated by the processor 212 and provided to the entity database 234, which then uses the calculated time amount to determine or update the value for the associated action. The time it takes for a user to perform an action can be also be provided manually to the entity database 234, such as by an administrator assigning a predetermined value.

The value can be updated periodically using recent user data. For example, the value can be updated on a daily basis at the end of the day after user data for the day has been used for calculations.

In certain aspects, the value associated with an action can be based on both a relevance to a user and a predetermined relevance of the action to an entity. For example, for each action, the relevance to the user can be weighted according to one factor, and the predetermined relevance of the action to an entity can be weighted according to another factor, and a combination of the weighted values can be used as the value for the action. In certain aspects, other factors can also be considered. For example, the associated value for an action can be based on a frequency of times a user has selected the action, such as where a value for an action is increased based on a number of times the action is selected to be performed.

Returning to the identification of referent entities, an entity can also be identified as a referent based on the number of occurrences of an entity from the list of entities identified in the user viewable content. For instance, if an entity identifier (e.g., text) "Sushi ABC" appears in user viewable content more than any other identifier, then a referent of the user viewable content can be identified as Sushi ABC.

An entity can further be identified as a referent by comparing user viewable content of an image directly with an image or images associated with entities in the entity database 234. If the user viewable content of an image appears substantially similar to an image associated with an entity in the entity database 234 (e.g., the similarity between the user viewable content and the image associated with the entity has a higher probability value than the similarity between the user viewable content and an image associated with any other entity in the entity database 234), then the entity associated with the image can be identified as the referent of the select content. Similarity between images can be determined using image recognition technology well known to those of ordinary skill in the art.

When the content file 224 is a web page, then an entity can be identified as a referent based on other web pages that link to the web page, other web pages that are linked to from the web page, text on the web page, or an image on the web page. For example, a user selects content from a content file 224, namely, a web page that incorrectly refers to President George H. W. Bush as "George W. Bush." Other web pages that link to the web page frequently and correctly include the text "George Bush Sr." and "George H. W. Bush." The disclosed system correctly identifies the referent entity of the user viewable content on the web page, "George W. Bush," as George H. W. Bush, even though the user viewable content that incorrectly included the text "George W. Bush."

A previous selection of an entity by another user as an appropriate referent can also be used to identify entities as referents. The other user can be associated with the user that selected the content, such as by referring to the user's contact listing, the user's online social network data, or the user's electronic correspondence. For example, when a user selects content, an entity of that user viewable content can be identified as a referent widget to buy if the user's friend also bought that widget.

An entity can further be identified as a referent from user viewable content based on whether a corresponding entity from the entity database 234 is identified in response to a search query of the user viewable content. For example, if the user viewable content "Malagasy cuisine encompasses the diverse culinary traditions of the island of Madagascar; foods eaten in Madagascar reflect the influence of Southeast Asian, African, Indian, Chinese and European migrants" is entered into a search query, and the highest ranking result from the search query is a web page titled "Malagasy cuisine," then the referent of the user viewable content can be identified as Malagasy cuisine from among the entities Malagasy cuisine, Southeast Asia, Africa, India, China, Europe, and migrants. As another example, if a user selects content that is an image of a structure, and a search query of the image returns the text "Washington monument" as the most common result, then the user viewable content can be identified as an image of the referent entity Washington monument.

An entity can yet further be identified as a referent from user viewable content based on a web page previously selected in response to a search query that includes at least a portion of the user viewable content. For example, the content "Malagasy cuisine encompasses the diverse culinary traditions of the island of Madagascar, foods eaten in Madagascar reflect the influence of Southeast Asian, African, Indian, Chinese and European migrants" is selected by a user. The same or similar content was previously selected and entered into a search query by the same user or another user. In response to the search results the user selected a web page titled "Malagasy cuisine." The referent entity of the user viewable content can then be identified as Malagasy cuisine.

Proximity of an entity from the entity database 234 that is identified in the user viewable content to the current location of the client 110, a past location of the client 110, or a known future location of the client 110 (e.g., derived from a future restaurant reservation known to the system, or an appointment in the user's calendar) can be used to identify the entity as a referent. For example, if a user selects the content "Mountain View's multi-cultural restaurants, sidewalk cafes, specialty shops and professional services," and the current location of the user's device is near the city of Mountain View, Calif., then the referent entity Mountain View can be identified from among the various entities: restaurant, café, shop, and professional services.

A previous use of the user viewable content by the user or another user, such as a previous selection by the user or another user of a referent entity of content that includes the user viewable content, can also be used to identify a referent entity. For example, if a user selects content that is identical to content that has been selected in the past by another user, and the other user in the past acted on a certain entity identified from the content as the referent, then that same referent entity can be presented to the current user.

An entity can further be identified as a referent based on a proximity of entities (e.g., from the entity database 234), to the current location of the client 110, that are identified in the user viewable content that have at least a predetermined ranking value in a result listing of a search query that includes at least a portion of the user viewable content. For example, if a user selects the content "Mountain View's multi-cultural restaurants, sidewalk cafes, specialty shops and professional services," the current location of the user's device is near the city of Mountain View, Calif., and a search of the user viewable content returns "Mountain View" as the top ranking result, then the referent Mountain View can be identified from among the various entities: restaurant, café, shop, and professional services.

If an entity is not appropriately identified as a referent in response to a selection of content by a user, then the user can be provided with an interface for manually identifying the entity intended to be the referent. For example, the interface can be a text box. If the referent entity is not present in the entity database 234, then the entity can be added to the entity database 234, for example, manually by the user. The user can also be provided with an opportunity to correct or otherwise annotate the user viewable content to disambiguate the user viewable content or provide additional information that would facilitate the identification of a referent entity. For example, the user can de-select a portion of the user viewable content, select additional content, or manually provide input (e.g., in a displayed text box) that provides additional identifying information for the user's intended referent.

Returning to FIG. 3, and continuing as part of step 330, an identifier of the identified referent entity(s) is provided to the client 110 to display to the user. An identifier of an action(s) associated with a predicted user purpose(s) for the identified entity(s) can also be provided to the client 110 to display to the user. Next, in step 350 the processor 236 is configured to execute instructions to provide, for display, the identifiers at, near, with, or in association with a search query field. For example, when a user directs a cursor to a search query field, or begins typing within the search query field, text describing or naming the identified entities and actions can be displayed below the search query field. The user can then select an appropriate entity or action to search for, load, or execute.

When the entity is a product, such as a bicycle, the actions that can be presented to the user on the client 110 can include providing a review of the product, identifying a seller of the product, providing a price for the product, or providing an offer (e.g., discount or coupon) associated with the product. When the product is software, the associated actions can also include providing a location for downloading the software, or installing the software. When the entity is a service, such as watching a movie or a plumber for hire, the actions that can be presented to the user on the client 110 include providing a review of the service, identifying an availability of the service (e.g., show times), identifying a location where the service is being provided (e.g., an address of the plumber), or providing an option to purchase the service (e.g., purchasing tickets for the movie or rates offered by the plumber). When the entity is a location, such as a restaurant, the actions that can be presented to the user on the client 110 include providing a review of the location, identifying an address of the location, providing directions to the location, providing information on availability of the location (e.g., making a reservation), providing information on parking associated with the location, or providing an offer associated with the location. When the entity is a person, the actions that can be presented to the user on the client 110 include providing contact information for the person, a description of the person, an image of the person, or information on a relationship with the person (e.g., in an online social network).

FIG. 3 sets forth an example process 300 for identifying an entity based on user viewable content using the example client 110 and server 130 of FIG. 2. An example will now be described using the example process 300 of FIG. 3, a client 110 that is a tablet computer with a touchscreen interface, an application 222 that is a web browser, and a content file 224 that is a web page for a restaurant Sushi ABC.

Figure 4A:
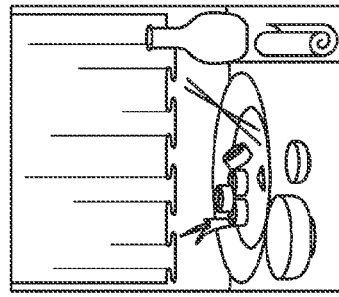
FIGS. 4A-4C are example illustrations associated with the example process of FIG. 3.

The process 300 proceeds to step 310 when a user on a tablet computer 110 opens a web browser 222 to view a web page 224. FIG. 4A provides an example illustration 400 of the web page 224. An identifier, namely the Uniform Resource Locator (URL) address, of the web page 224 is provided to the server 130 when the user leaves the web page (e.g., chooses to view another web page or conduct another action in the web browser 222) along with information on the context (e.g., location of the tablet computer 110) in which the web page 224 was viewed on the tablet computer 110. In step 330, the server 130 loads a copy of the web page 224 using the URL provided by the client and then interprets the content of the web page (e.g., text and images) to identify any entity(s) and predicted or expressed (e.g., via user selection) user purpose(s) associated with the web page 224.

Specifically, a search query is run of the user viewable content, and the highest value results are web pages for: (1) the restaurant Sushi ABC, (2) the food sushi, (3), the city of Mountain View, Calif., and (4) a page listing restaurants in Mountain View. The URL for each high value result is then evaluated against the entity database 234. For example, the URL of the web page for the restaurant Sushi ABC is evaluated in the entity database 234, and the entity database 234 returns the entity Sushi ABC as the entity being referred to due to the Sushi ABC entry in the entity database 85 including the identical URL for the restaurant. The entity Sushi ABC is associated with a descriptors "location" and "restaurant" in the database. The entity Sushi ABC is also associated in the entity database 234 with the purposes of going to the restaurant, calling the restaurant, saving information on the restaurant, and offers associated with the restaurant. These purposes are associated with the actions of providing directions to the restaurant, dialing the restaurant, adding the restaurant information to a contacts database, and displaying offers associated with the restaurant, respectively.

Identifiers of the entities Sushi ABC (the text "Restaurant Sushi ABC"), sushi (the text "sushi"), Mountain View, Calif. (the text "Mountain View, Calif."), as well as an identifier of the group of entities restaurants in Mountain View (the text "restaurants in Mountain View, Calif."), are then provided by the server 130 to the tablet computer 110 for display. A listing of actions 422 associated with the highest probability/value entity Sushi ABC is also provided by the server 130 to the client 110 for display. The entities and actions are not, however, displayed immediately. When the user thereafter conducts a web search by placing a cursor in a search input field, thereby indicating the user has finished viewing the web page 224, the identifiers of the entities and actions are displayed in step 350. The process 300 then ends.

Figure 4B:
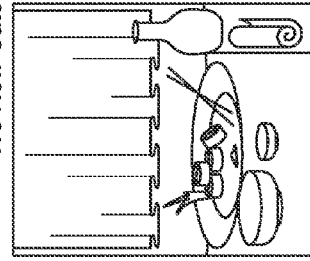

FIG. 4B provides an example illustration 410 of one embodiment for displaying the entities and actions. In the example illustration 410, the entities and actions are displayed in step 350 in a suggestions list below the search input field 424 when the user directs a cursor to the search input field 424 while the content web page 224 is still loaded and displayed. The suggestions list includes the identifiers: "Sushi ABC" 412, which, when selected by the user, takes the user to the home page for Sushi ABC in the web browser 222; "Directions from your location to Sushi ABC" 414, which, when selected by the user, takes the user to a web page in the web browser 222 displaying directions from the current location of the tablet computer 110 to the geographical address for Sushi ABC; "Call Sushi ABC" 416, which, when selected by the user, places a telephone call from the tablet computer 110 to the work telephone number for Sushi ABC; "sushi" 418, which, when selected by the user, submits a web search in the web browser 222 for the term "sushi"; "Mountain View, Calif." 420, which, when selected by the user, submits a web search in the web browser 222 for the term "Mountain View, Calif."; and "restaurants in Mountain View, Calif." 422, which, when selected by the user, provides a listing in the web browser 222 of entities from the entity database 234 identified as restaurants in Mountain View, Calif.

Figure 4C:
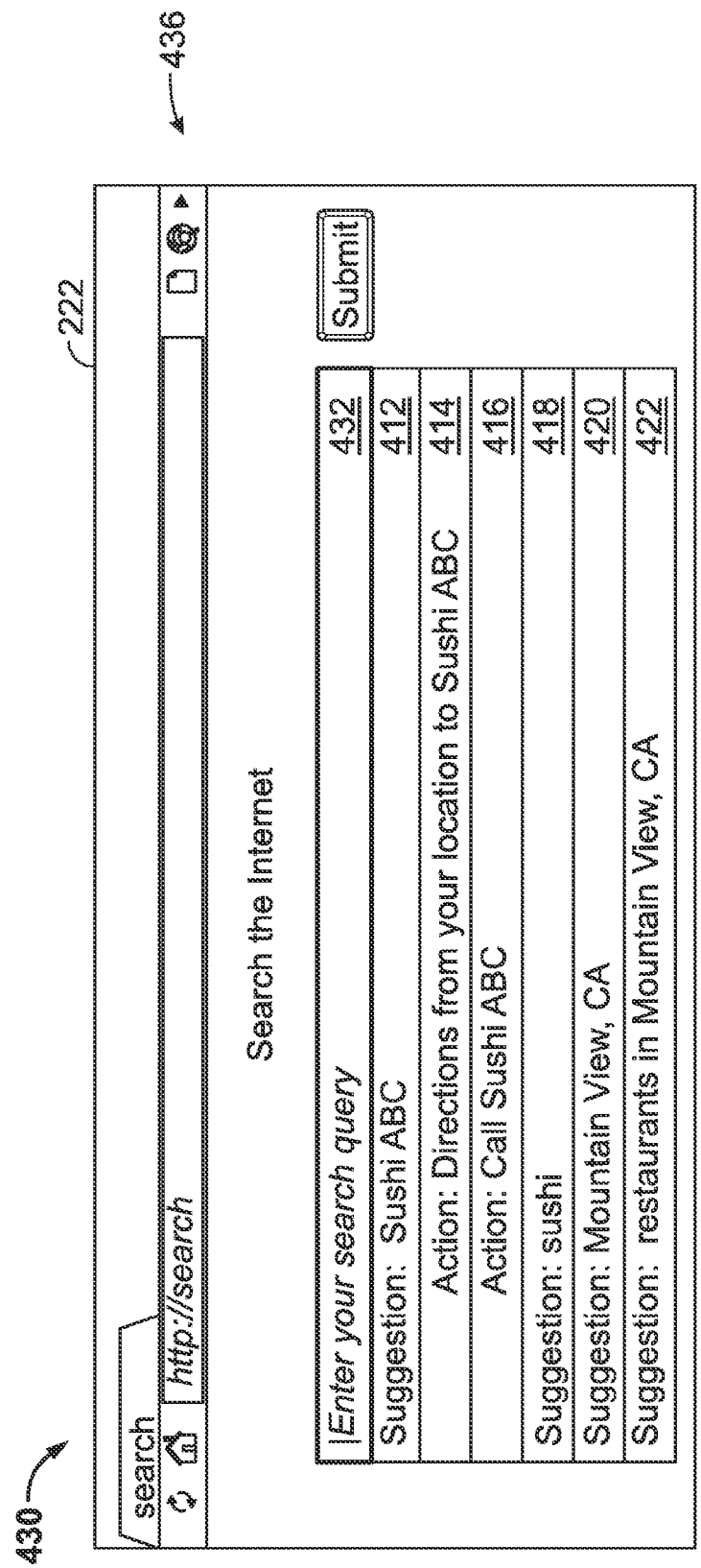

FIG. 4C provides an example illustration 430 of another embodiment for displaying the entities and actions. Unlike FIG. 4B, where the user directs a cursor to a search input field 424 while the content web page 224 is still loaded and displayed, in the example illustration 430 of FIG. 4C the user has loaded a search web page 436 in the web browser 222 that includes the search input field 432 and a search submission button 434. In the search web page 436, the same entities and actions of FIG. 4B are displayed in step 350 in a suggestions list below the search input field 424.

In yet other embodiments not illustrated, the suggestions list can be displayed after the user begins typing a query by entering at least one character in the search input field 432. For example, the suggestions list can be displayed on the search web page 436 after the user has entered the character "s" into the input field 432. In certain aspects, after the user begins typing a query, a search, loading, and/or execution of one or many of the items (e.g., entities or actions) in the suggestions list can be automatically requested or submitted. For example, if the user has enters the character "s" in the input field 432, the web browser 222 can automatically request the first item from the suggestions list, namely, information on (e.g., a home page for) Sushi ABC. In certain aspects, after the first item from the suggestions list is loaded, the web browser 222 can display the first item from the suggestions list.

The suggestions list can also include previously entered queries by the user or other users. For example, if the user previously entered a search query on the tablet computer 110 for "dictionary for spanish," and subsequently enters "d" into the input field 432 intending to type the query "dinner in mountain view", the displayed suggestions list can include the completed query "dictionary for spanish". The process 300 then ends.

Figure 5:
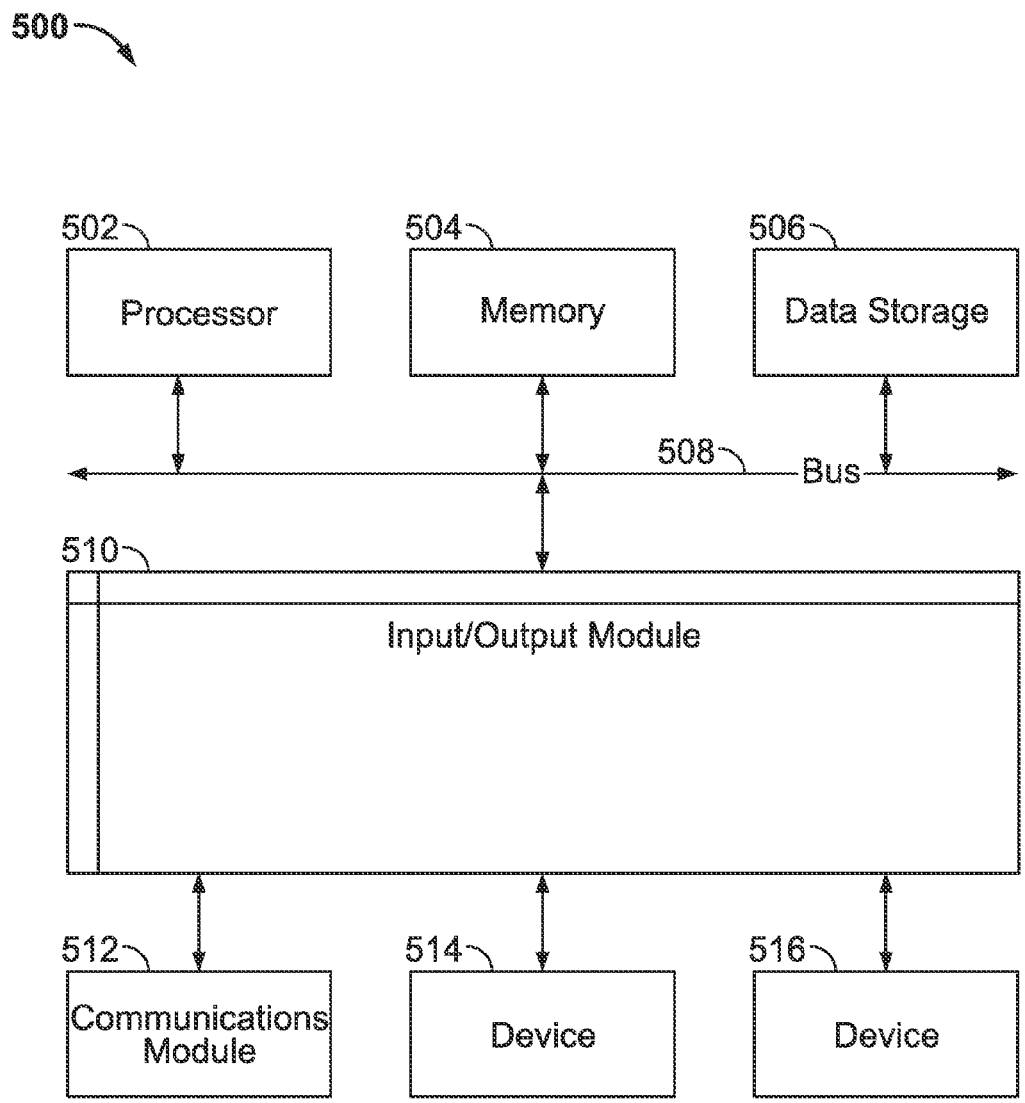
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a GPS receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing suggestions for a search based on previously viewed content, the method comprising:

receiving information on previously viewed content;

receiving a request to enter a query into a search field subsequent to receiving the information on the previously viewed content;

identifying, based on a user interaction with the content, at least one entity referred to in the content;

identifying, based on the user interaction with the content, at least one action associated with the entity; and providing identifiers of the at least one entity and the at least one action for display with the search field.

2. The computer-implemented method of claim 1, wherein the at least one entity and the at least one action are provided for display in a listing format.

3. The computer-implemented method of claim 2, wherein the listing includes an action associated with each entity identified in the listing.

4. The computer-implemented method of claim 2, wherein the at least one entity and the at least one action are provided for display along with a previously entered query by the user.

5. The computer-implemented method of claim 1, wherein the request to enter the query into the search field comprises directing a cursor into the search field or typing a partial query comprising at least one letter into the search field.

6. The computer-implemented method of claim 5, wherein a search for the at least one entity is submitted in response to receiving the partial query in the search field.

7. The computer-implemented method of claim 6, wherein at least one result from the search is provided for display after the search is submitted in response to receiving the partial query in the search field.

8. The computer-implemented method of claim 1, wherein the previously viewed content comprises an identification of a web page, the identification comprising an address of the web page, pointer to the web page, or a copy of the web page.

9. The computer-implemented method of claim 1, wherein the at least one entity is identified based on a frequency of an identifier of the at least one entity in the content.

10. A system for providing suggestions for a search based on previously viewed content, the system comprising:

a memory comprising an identification of a previously viewed user content, the identification comprising an address of the previously viewed user content, pointer to the previously viewed user content, or a copy of the previously viewed user content; and a processor configured to:
receive a request to enter a query into a search field;
identify, based on a user interaction with the content, at least one entity referred to in the content;
identify, based on the user interaction with the content, at least one action associated with the entity; and
provide identifiers of the at least one entity and the at least one action for display with the search field.

11. The computer-implemented method of claim 1, wherein the user interaction with the content includes at least one previous selection of the entity from the content.

12. The system of claim 10, wherein the user interaction with the content includes at least one previous selection of the entity from the content.

13. The system of claim 10, wherein the at least one entity and the at least one action are provided for display in a listing format.

14. The system of claim 13, wherein the listing includes an action associated with each entity identified in the listing.

15. The system of claim 13, wherein the processor is further configured to provide, for display, the at least one entity and the at least one action along with a previously entered query by the user.

16. The system of claim 10, wherein the request to enter the query into the search field comprises directing a cursor into the search field or typing a partial query comprising at least one letter into the search field.

17. The system of claim 16, wherein the processor is further configured to submit a search for the at least one entity in response to receiving the partial query in the search field.

18. The system of claim 17, wherein the processor is further configured to provide, for display, at least one result from the search after the search is submitted in response to receiving the partial query in the search field.

19. The system of claim 10, wherein the at least one entity is identified based on a frequency of an identifier of the at least one entity in the content.

20. A non-transitory machine-readable storage medium comprising machine-readable instructions for causing a processor to execute a method for providing suggestions for a search based on previously viewed content, the method comprising:

receiving information on at least one previously viewed web page of a user;

receiving a request of the user to enter a query into a search field subsequent to receiving the information on the at least one previously viewed web page;

identifying, based on a user interaction with the content, at least one entity referred to in the at least one previously viewed web page;

identifying, based on the user interaction with the content, at least one action associated with the entity; and providing identifiers of the at least one entity and the at least one action for display with the search field.

\* \* \* \* \*